(12) United States Patent
Akiyama et al.

(10) Patent No.: US 10,753,417 B2
(45) Date of Patent: Aug. 25, 2020

(54) STABILIZER BUSH

(71) Applicants: SUMITOMO RIKO COMPANY LIMITED, Komaki-shi, Aichi (JP); TOYOTA JIDOSHA KABUSHIKI KAISHA, Toyota-shi, Aichi (JP)

(72) Inventors: Yoshikane Akiyama, Komaki (JP); Masanobu Mizusaki, Komaki (JP); Yuji Homma, Toyota (JP)

(73) Assignees: SUMITOMO RIKO COMPANY LIMITED, Komaki-shi (JP); TOYOTA JIDOSHA KABUSHIKI KAISHA, Toyota (JP)

(*) Notice: Subject to any disclaimer, the term of this patent is extended or adjusted under 35 U.S.C. 154(b) by 152 days.

(21) Appl. No.: 15/822,921

(22) Filed: Nov. 27, 2017

(65) Prior Publication Data

US 2018/0245654 A1 Aug. 30, 2018

(30) Foreign Application Priority Data

Feb. 28, 2017 (JP) .................................. 2017-037667

(51) Int. Cl.
*F16F 1/16* (2006.01)
*B60G 21/055* (2006.01)
*F16F 1/38* (2006.01)

(52) U.S. Cl.
CPC ........ *F16F 1/3842* (2013.01); *B60G 21/0551* (2013.01); *F16F 1/16* (2013.01);
(Continued)

(58) Field of Classification Search
CPC .......... F16F 1/16; F16F 1/3842; F16F 1/3849; F16F 1/3876; B60G 21/055;
(Continued)

(56) References Cited

U.S. PATENT DOCUMENTS

| 5,290,018 A * | 3/1994 | Watanabe | B60G 21/0551 267/141.3 |
| 8,505,940 B1* | 8/2013 | Hufnagle | B60G 21/0551 280/124.13 |

(Continued)

FOREIGN PATENT DOCUMENTS

JP 2011-178274 A 9/2011

OTHER PUBLICATIONS

Febest NSB-T31F Bing/Amazon Dec. 23, 2013. [Online] Posted on Dec. 23, 2013 verified via Bing date range search. Retrieved from Internet: <https://www.amazon.ca/54613-Jg02A-54613Jg02A-Stabilizer-Bushing-Nissan/dp/B00HCOSAR2>. (Year: 2013).*

(Continued)

*Primary Examiner* — Barry Gooden, Jr.
(74) *Attorney, Agent, or Firm* — Oliff PLC

(57) ABSTRACT

A stabilizer bush including: a tubular rubber bushing body having an inner hole for inserting a stabilizer bar; and a mounting base provided on a fixing surface of the rubber bushing body against a vehicle body. The stabilizer bush is configured to be installed on the vehicle body such that an outer peripheral surface of the rubber bushing body is press-fitted on a side of the vehicle body via the mounting base by a roughly U-shaped bracket to be fixed to the vehicle body. The rubber bushing body includes a shock absorbing rubber part that is elastically deformed due to a compression force caused by pressing of the bracket, bulges to both sides in the width direction of the mounting base, and enters and interposes between the mounting base and the bracket.

6 Claims, 5 Drawing Sheets

(52) U.S. Cl.
 CPC ............... *B60G 2202/135* (2013.01); *B60G 2204/1222* (2013.01); *B60G 2204/41* (2013.01)

(58) Field of Classification Search
 CPC ........ B60G 21/0551; B60G 2204/1222; B60G 2204/41; B60G 2204/41043
 See application file for complete search history.

(56) References Cited

U.S. PATENT DOCUMENTS

| | | | | |
|---|---|---|---|---|
| 9,393,852 | B2* | 7/2016 | Kobayashi | B60G 21/0551 |
| 2002/0135115 | A1* | 9/2002 | Hayashi | F16F 1/3842 |
| | | | | 267/141.2 |
| 2004/0070161 | A1* | 4/2004 | Fader | B60G 21/0551 |
| | | | | 280/124.166 |
| 2004/0207135 | A1* | 10/2004 | Joseph | B60G 21/0551 |
| | | | | 267/141.1 |
| 2008/0067727 | A1* | 3/2008 | Schwarz | B60G 21/0551 |
| | | | | 267/141.1 |
| 2010/0176544 | A1* | 7/2010 | Miyamoto | B60G 3/14 |
| | | | | 267/189 |
| 2012/0299261 | A1* | 11/2012 | Nagai | F16F 1/16 |
| | | | | 280/124.107 |
| 2016/0303939 | A1* | 10/2016 | Tsukamoto | B60G 21/0551 |
| 2017/0008365 | A1* | 1/2017 | Tsukamoto | B60G 21/0551 |
| 2017/0080772 | A1* | 3/2017 | Matsumura | B60G 21/0551 |
| 2018/0141402 | A1* | 5/2018 | Oh | B60G 21/0551 |

OTHER PUBLICATIONS

Febest NSB-T31F. Parts catalog [Online]. Febest.de [Retrieved on Dec. 6, 2019]. Retrieved from Internet: <https://febest.de/en/details/front_stabilizer_bar_bush_d22-nsb_t31f>. (Year: 2019).*

Mevotech MS308100. Parts catalog [online]. Mevotech.com [Retrieved on Dec. 6, 2019]. Retrieved from Internet: <https://partsonline.mevotech.com/details/MS308100>. (Year: 2019).*

* cited by examiner

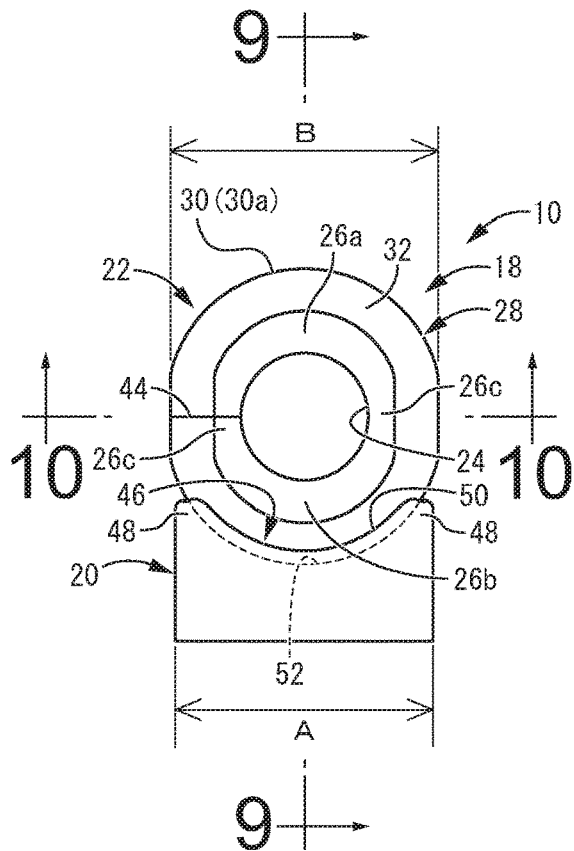
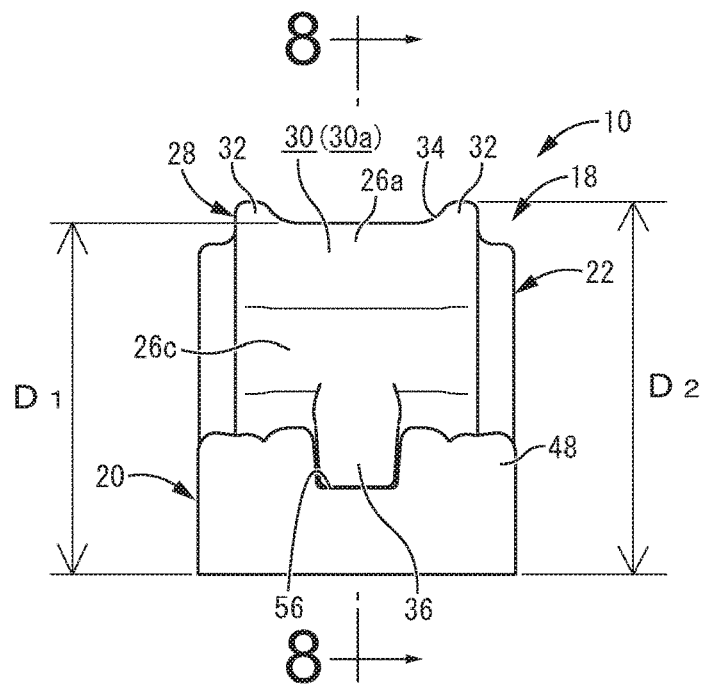

STABILIZER BUSH

INCORPORATED BY REFERENCE

The disclosure of Japanese Patent Application No. 2017-037667 filed on Feb. 28, 2017 including the specification, drawings and abstract is incorporated herein by reference in its entirety.

BACKGROUND OF THE INVENTION

1. Field of the Invention

The present invention relates generally to a stabilizer bush that anti-vibrationally supports a stabilizer bar to the vehicle body, and in particular to a stabilizer bush with a mounting base which is fixed on an overlapping face of a bushing body against the vehicle body.

2. Description of the Related Art

Conventionally, in vehicles such as automobiles, a stabilizer bar is used for suppressing the inclination of the vehicle during revolution etc., and improving the running stability. The stabilizer bar is also known as anti-roll bar. Usually, the stabilizer bar is disposed protruding between the left and right suspensions, and the intermediate portion of the length direction is anti-vibrationally supported to the vehicle body via a stabilizer bush.

In general, the stabilizer bush is provided with a rubber bushing body made of a tubular rubber elastic body, and the rubber bushing body is installed externally onto the stabilizer bar and bonded with or without an adhesive. On the other hand, a roughly U-shaped bracket is externally fitted to the outer peripheral surface of the rubber bushing body. With the rubber bushing body partially superimposed in the circumference on one side of the vehicle body, the rubber bushing body can be attached on one side of the vehicle body with the bracket.

The stabilizer bush supports anti-vibrationally the stabilizer bar with respect to the vehicle body by virtue of the elastic properties of the rubber bushing body. Also, the stabilizer bush allows the deformation in the torsional direction caused in the stabilizer bar due to the differential generated between the left and right wheels during running of the vehicle, by mean of sliding in the circumferential direction of the stabilizer bar with respect to the rubber bushing body and elastic deformation of the rubber bushing body.

Meanwhile, the relative positional relationship between the stabilizer bar and the vehicle body varies depending on the type of the vehicle, and there are also instances of such as the stabilizer bar becoming quite separated from the vehicle body, etc. In such case, as described in JP-A-2011-178274, etc., there may be used a stabilizer bush with a mounting base wherein the mounting base is fixed on the overlapping face of the rubber bushing body against the vehicle body. By adjusting the size of the mounting base, it will also be possible to deal with the distance between the stabilizer bar and the vehicle body, without using other methods such as increasing the size of the rubber bushing body, etc.

However, the stabilizer bush of conventional structure provided with the mounting base may suffer from a circumferential displacement of the mounting base fixed on the rubber bushing body within the bracket, due to the external force around the central axis exerted on the rubber bushing body by the torsionally deformed stabilizer bar. This may case noises due to striking of the mounting base and the bracket. To resolve this problem, efforts were made to fit and mount the mounting base with no gap to the bracket, but it was difficult to implement due to tolerance of parts etc.

SUMMARY OF THE INVENTION

It is therefore one object of the present invention to provide a stabilizer bush of a novel structure, which is able to avoid striking of the mounting base and bracket and thereby, prevent the abnormal sound.

The above and/or optional objects of this invention may be attained according to at least one of the following modes of the invention. The following modes and/or elements employed in each mode of the invention may be adopted at any possible optional combinations.

A first mode of the present invention provides a stabilizer bush comprising: a tubular rubber bushing body having an inner hole for inserting a stabilizer bar; and a mounting base provided on a fixing surface of the rubber bushing body against a vehicle body; wherein the stabilizer bush is configured to be installed on the vehicle body such that an outer peripheral surface of the rubber bushing body is press-fitted on a side of the vehicle body via the mounting base by a roughly U-shaped bracket to be fixed to the vehicle body, and the rubber bushing body includes a shock absorbing rubber part that is elastically deformed due to a compression force caused by pressing of the bracket, bulges to both sides in the width direction of the mounting base, and enters and interposes between the mounting base and the bracket.

For the stabilizer bush with this structure according to the first mode, since the shock absorbing rubber part that enters the gap between the mounting base and the bracket has been provided in the rubber bushing body, a direct hitting between the mounting base and bracket is avoided, and occurrence of abnormal noise can be effectively suppressed.

A second mode of the present invention provides the stabilizer bushing according to the first mode, wherein the mounting base has a width dimension A at a side of overlapping with the rubber bushing body, and with respect to the width dimension A, a maximum width dimension B of the rubber bushing body is set as A≤B in a state where there is no external force on the rubber bushing body.

With the stabilizer bush having a structure according to the present mode, in the state where there is no external force on the rubber bushing body, the maximum width dimension B of the rubber bushing body is made equal to or larger than the width dimension A of the mounting base at the side of overlapping with the said rubber bushing body (A≤B). Therefore, by applying the compression force to the rubber bushing body due to an external fitting of the bracket on the rubber bushing body, the shock absorbing rubber part of the rubber bushing body is more likely to be inserted between the mounting base and the bracket. That is, the bracket is held in close contact on an outer circumferential surface of the rubber busing body except the overlapping surface of the rubber bushing body against the mounting base, so that a clamping force is applied to the outer circumferential surface of the rubber bushing body. Owing to this clamping force applied to the outer circumferential surface of the rubber bushing body, the rubber bushing body elastically deforms, expanding towards the free surface that is facing the gap formed between the mounting base and the bracket, and enters into the gap.

A third mode of the present invention provides the stabilizer bush according to the first or second mode, wherein further comprising concave-convex interlocking portions provided between overlapping surfaces of the mounting base and the rubber bushing body, the concave-convex interlocking portions extending in a width direction on both side portions in a length direction of the rubber bushing body.

With the stabilizer bush having a structure according to the present mode, the clamping force applied from the bracket on the outer circumferential surface of the rubber bushing body causes elastic deformation of the rubber bushing body in expansion in both sides of the axial direction. An amount of this elastic deformation can be suppressed by the concave-convex mating parts provided on both sides in the length direction. As a result, the degree of expansion deformation taking place in the gap between the mounting base and the bracket can be efficiently maintained, and a more stable function can be achieved with the target shock absorbing rubber part.

A fourth mode of the present invention provides the stabilizer bush according to any one of the first through third modes, wherein on an overlapping surface of the mounting base against the rubber bushing body, curved corner sections are formed by R-chamfering corners at both side edge portions in the width direction.

With the stabilizer bush having a structure according to the present mode, the overlapping surface of the mounting base against the rubber bushing body has curved corner sections formed by R-chamfering corners at both side edge portions in the width direction. Therefore, the shock absorbing rubber part of the rubber bushing body is more easily and efficiently inserted along the curved corner part into the gap between the bracket and mounting base.

A fifth mode of the present invention provides the stabilizer bush according to any one of the first through fourth modes, further comprising a locking portion disposed between the mounting base and the rubber bushing body for maintaining an assembled state by preventing mutual detachment.

With the stabilizer bush having a structure according to the present mode, a mutually assembling locking part is disposed between the mounting base and the rubber bushing body. Thus, the job of assembling of mounting base and the rubber bushing body can be easily done. In addition, since the mounting base and the rubber bushing body are maintained in an assembled state by the locking part, the operation of fitting an assembly of the mounting base and the rubber bushing body between the bracket and the vehicle body is also made easy.

With a stabilizer bush of structure according to the present invention, since the shock absorbing rubber part that enters the gap between the mounting base and the bracket has been provided in the rubber bushing body, a direct hitting between the mounting base and bracket is avoided, and occurrence of abnormal noise can be effectively suppressed.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein:

FIG. 5 is a front view of the stabilizer bush of FIG. 1 in a non-installation state on a vehicle;

FIG. 6 is a side view of the stabilizer bush of FIG. 5;

DETAILED DESCRIPTION OF EMBODIMENTS

Figure 1:
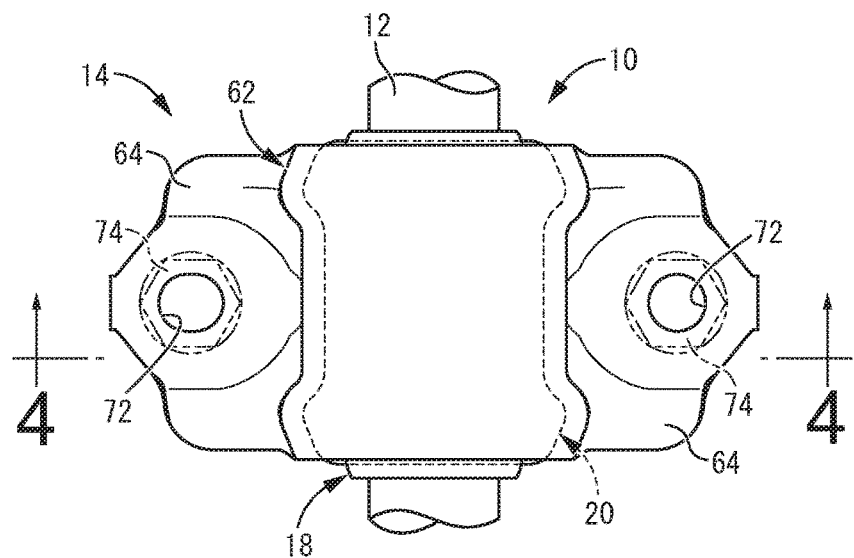
FIG. 1 is a plan view showing a stabilizer bush as one embodiment of the present invention in an installation state on a vehicle.

The embodiments of the present invention are described below while referring to the drawings.

First, the stabilizer bush 10 as one embodiment of the present invention is shown in FIGS. 1 to 4 in a state where it is installed on the vehicle. FIGS. 5 to 10 show the stabilizer bush 10 in a state where it is not installed on the vehicle. To the stabilizer bush 10 shown in FIGS. 5 to 10, a stabilizer bar 12 is inserted, and a bracket 14 is fitted externally from the outside, whereby the stabilizer bush 10 is fixed on the vehicle body 16, and installed on the vehicle. In the state where the stabilizer bush 10 is installed on the vehicle, the stabilizer bar 12 is supported by a vehicle body 16 in a vibration-damping manner via the stabilizer bush 10. In the following description, the axial or longitudinal direction refers to the vertical direction in FIG. 1 which becomes the central axial direction of the stabilizer bar 12, and the upper lower direction is referred as vertical direction in FIG. 2, whereas the width direction is referred as horizontal direction in FIG. 1.

To be more specific, the stabilizer bush 10 includes a rubber bushing body 18 and a mounting base 20 that is provided between the rubber bushing body 18 and the vehicle body 16.

As shown in FIGS. 5 to 10, the rubber bushing body 18, as a whole, is formed in the shape of a thick tube having a substantially oval cross-sectional shape, and extends in the axial direction (horizontal direction in FIG. 6). That is, the rubber bushing body 18 comprises a peripheral wall part 22, and an inner hole 24 located on the inner peripheral side of the peripheral wall part 22. Both the upper and lower side sections 26a and 26b of this peripheral wall part 22 is formed in a substantially semicircular shape respectively. Both the widthwise side sections 26c, 26c extend in the vertical direction and connect with the peripheral ends of the upper and lower side sections 26a, 26b. The peripheral wall part 22 with a substantially oval shape is formed consisting of these upper and lower side sections 26a, 26b and the widthwise side sections 26c, 26c. The inner hole 24 extends straight in a circular cross-section, and penetrates the substantially central portion of the rubber bushing body 18 in the axial direction.

The rubber bushing body 18 includes at its axially intermediate portion a large diameter section 28 having an outer diameter larger than that in both the axial end portions. This large diameter section 28 has a given axial length, and is formed over the entire circumference in the circumferential direction. In other words, the outer peripheral surface 30 of the rubber bushing body 18 includes an overlapping surface in the form of an outer peripheral surface 30a of the large diameter section 28. The outer peripheral surface 30a of this large diameter section 28 has a form overall as a circular ring shaped curved surface extending over the entire circumference of the circumferential direction.

In the axial both end sections of the outer peripheral surface 30a of this large diameter section 28, interlocking convex portions 32, 32 having increased outer diameter are provided by protruding in the outer peripheral side along the entire circumference of the circumferential direction. Therefore, in the axial middle portion of the outer peripheral surface 30a of the large diameter section 28, a concave groove 34, which is relatively more hollow than the interlocking convex portions 32, 32, has been formed over the entire circumference in the circumferential direction. This concave groove 34 has a given axial dimension, and the groove bottom surface of the concave groove 34 extends continuously over the entire circumference. In the present embodiment, the outer diameter dimension (the outer diameter dimension in the groove bottom surface of the concave groove 34) of the portion in the large diameter section 28 where the concave groove 34 is formed, has been made larger than the outer diameter dimension of the axial direction both-ends portion of the rubber bushing body 18 protruding from the axial direction both-ends surface of the large diameter section 28.

In the center portion in the axial direction of the large diameter section 28, positioning protrusions 36, 36 are located approximately in the center in the groove width direction of the concave groove 34, and are provided protruding downward from the outer peripheral surface 30a of the both widthwise side sections 26c, 26c. In this embodiment, the positioning protrusions 36, 36 are formed in block shape which is substantially rectangular in both side view and bottom view, and the lower surfaces of the positioning protrusions 36, 36, in addition to becoming outward in the width direction, are arranged as moderately curved surfaces that incline downward.

Furthermore, in the axially center part of the large diameter section 28, a locking projection 38 is located between positioning protrusions 36, 36, and is provided protruding downward from the outer peripheral surface 30a of the lower side section 26b. This locking projection 38 includes a handle 40 at a protruding base end (upper) side as well as a cap part 42 at a protruding tip (lower) side. The outer diameter dimension of the cap part 42 is made larger than that of the handle part 40.

The rubber bushing body 18 also includes a slit-like cutout 44 at one part on the circumference (in this embodiment, left side of in FIG. 5) The slit-like cutout 44 penetrates the rubber bushing body 18 in the thickness direction. The cutout 44 extends over the entire axial length of the rubber bushing body 18. By pulling both sides sandwiching the cutout 44 in the rubber bushing body 18 in the direction of separation in the circumferential direction, it is possible to elastically deform the rubber bushing body 18 at the formation portion of the cutout 44 in the direction of expansion. This cutout 44, for example, can be provided by cutting off with such as a cutter knife etc., after forming the rubber bushing body 18.

Figure 9:
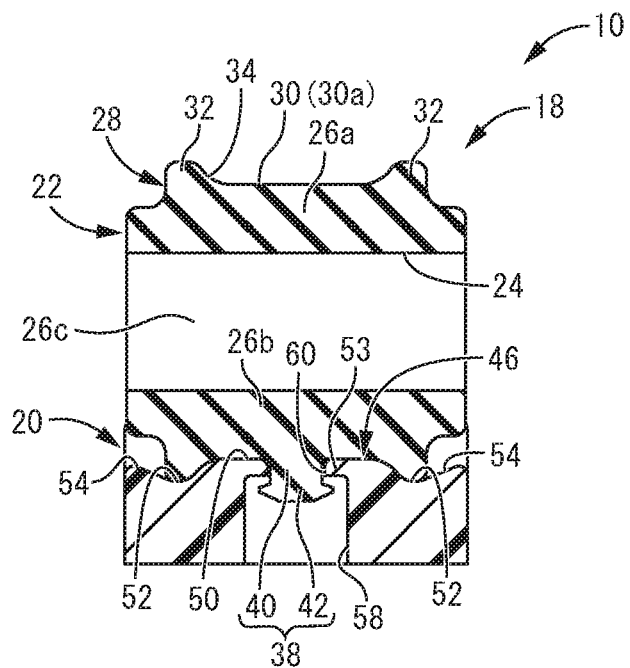
FIG. 9 is a cross sectional view taken along line 9-9 of FIG. 5.
Figure 10:
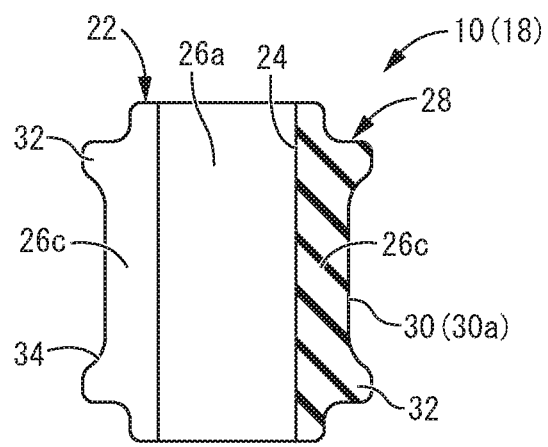
FIG. 10 is a cross sectional view taken along line 10-10 of FIG. 5.

The mounting base 20 is assembled to the rubber bushing body 18 with the shape as described above. The mounting base 20 is formed in the shape of a rectangular block, and has a roughly rectangular parallelepiped shape in which the lengthwise dimension (horizontal direction in FIG. 6) is larger than the widthwise dimension (horizontal direction in FIG. 5). In this embodiment, as shown in FIG. 6 or 9, in the state where there is no external force on the rubber bushing body 18, the lengthwise dimension of the mounting base 20 is made same as or slightly larger than the lengthwise dimension of the rubber bushing body 18. This mounting base 20 is optimally made of, for example, hard synthetic resin or metal, etc.

An upper surface 46 of the mounting base 20 has a shape almost corresponding to the outer peripheral surface 30a of the large diameter section 28 in the lower side section 26b of the peripheral wall portion 22 in the rubber bushing body 18. That is, the upper surface 46 of the mounting base 20 has a shape wherein both side edges in the width direction protrude upward, as compared with the width direction center portion. In short, in the upper surface 46 of the mounting base 20, shoulder parts 48, 48 protruding upward are provided on both widthwise side sections, whereas in the widthwise center portion are provided curved concave surfaces 50, 50 that are relatively hollower than these shoulder portions 48, 48 and open in the upward direction. In the present embodiment, the corner part of the shoulder portions 48, 48 are R-chamfered and curved corner sections is constituted from the chamfered shoulder portions 48, 48. The curved concave surface 50 is formed with a curvature substantially corresponding to the outer peripheral surface 30a of the large diameter section 28 provided in the lower side section 26b of the rubber bushing body 18 and extends in the width direction of the mounting base 20.

Figure 7:
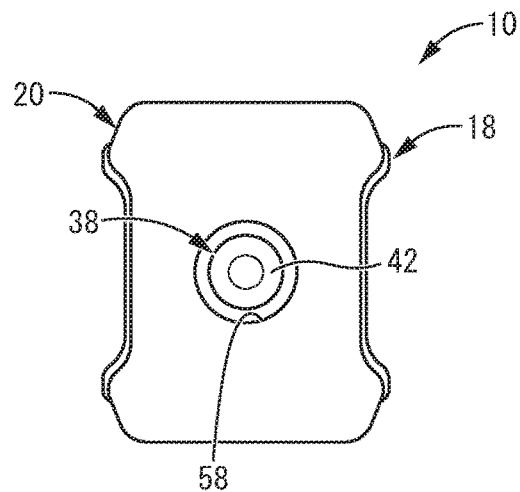
FIG. 7 is a bottom view of the stabilizer bush of FIG. 5.
Figure 8:
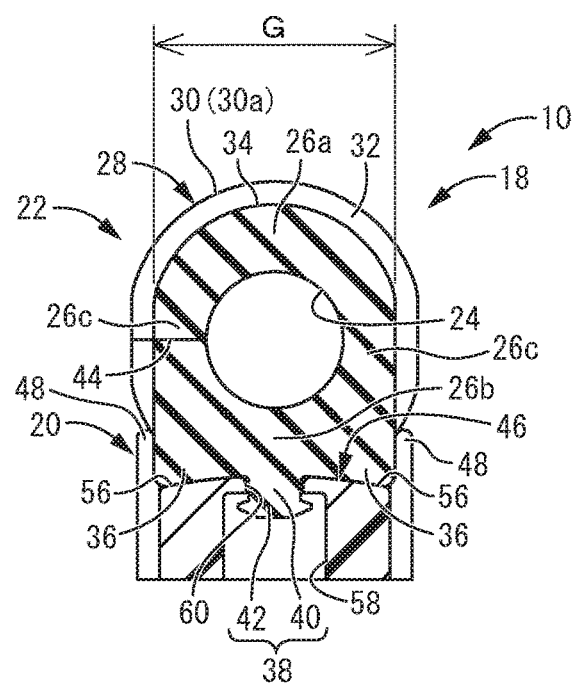
FIG. 8 is a cross sectional view taken along line 8-8 of FIG. 6.

Also, in both widthwise side portions of the mounting base 20, interlocking concave portions 52, 52, which are more concave than the curved concave surfaces 50, 50, are provided in the width direction center portion at a position spaced inward in the length direction by a predetermined position from the length direction end surface. In other words, between the lengthwise direction of these interlocking concave portions 52, 52, the upper face is formed as a curved concave face 50, and a central convex portion 53 that is relatively more convex (the depth dimension becomes smaller) compared to the interlocking concave portions 52, 52 is formed. This interlocking concave portion 52 and the central convex portion 53 are formed as concave and convex portions corresponding to the interlocking convex portions 32, 32 and concave groove 34 respectively of the rubber bushing body 18, and extend in the width direction of the mounting base 20. As shown in FIG. 7, the widthwise dimension of the mounting base 20 is made partially larger at the location where the interlocking concave portions 52, 52 is formed. In the present embodiment, among the upper surface 46, the surfaces that are extending from the interlocking concave portions 52, 52 to the length direction end portions are formed as inclined surfaces 54, 54 which are inclined upward as they go outward in the longitudinal direction.

Furthermore, in the shoulder portions 48, 48, positioning concave portions 56, 56, are provided at both end edges in the width direction of the mounting base, which open in the upward direction and are formed in the central portion in the length direction. These positioning concave portions 56, 56 are formed corresponding to the positioning protrusions 36, 36 provided in the outer peripheral surface 30a of the rubber bushing body 18, and penetrate the shoulder parts 48, 48 in the width direction. The bottom surfaces of the positioning concave portions 56, 56 correspond to the lower surfaces of the positioning protrusions 36, 36 and are made as moderately curved surfaces inclining downward as they go outward in the width direction.

On the lower surface of the mounting base 20, a central concave portion 58 that opens downward has been formed in the central section in the length direction and width direction. This central concave portion 58 formed in the shape of an inverted bottomed circular concave portion, and an insertion hole 60 penetrating in the vertical direction is formed in the center section of the upper bottom wall portion. Thus, the insertion hole 60 opens in the upper surface 46 of the mounting base 20. The inner diameter dimension of the central concave portion 58 is made larger than the outer diameter of the cap part 42 of the locking projection 38 in the rubber bushing body 18. On the other hand, the inner diameter dimension of the insertion hole 60 has been made smaller than the outer diameter of the cap part 42 of the locking projection 38, but larger than the outer diameter of the handle 40.

The stabilizer bush 10 of the present embodiment is configured by superposing the rubber bushing body 18 from above on the mounting base 20 having the shape as described above followed by locking and fixing them together. That is, the positioning protrusions 36, 36 protruding downward from both widthwise sides of the rubber bushing body 18 are engaged in the positioning concave portions 56, 56 provided on both sides in the width direction of the mounting base 20, and the locking projection 38 protruding downwards from the rubber bushing body 18 is inserted into the insertion hole 60 provided in the mounting base 20. When inserting the locking projection 38 into the insertion hole 60, the cap part 42 of the protruding tip of the locking projection 38 undergoes elastic deformation and becomes smaller than inner diameter dimension of the insertion hole 60, and after passing through the insertion hole 60, by elastically restoring and deforming, prevents the locking projection 38 from coming out upward from the insertion hole 60.

In this manner, the positioning protrusions 36, 36 provided on the rubber bushing body 18 are engaged into the positioning concave portions 56, 56 provided in the mounting base 20. By inserting the locking projection 38 into the insertion hole 60, the rubber bushing body 18 is prevented from rotating around the center axis with respect to the mounting base 20. Thus, since the locking projection 38 is inserted into the insertion hole 60 and thereby prevented from coming out in the upward direction, a locking portion has been configured from locking projection 38 and the insertion hole 60 for preventing mutual disengagement as well as maintaining an assembled state.

In the assembled state of the rubber bushing body 18 and the mounting base 20, in addition to engaging the interlocking convex portions 32, 32 of the rubber bushing body 18 into the interlocking concave portions 52, 52 of the mounting base 20, the central convex portion 53 of the mounting base 20 is fitted into the concave groove 34 of the rubber bushing body 18 so that the rubber bushing body 18 and the mounting base 20 overlap with each other. That is, an overlapping surface is provided in the peripheral wall part 22 of the mounting base 20 where the outer peripheral surface 30*a* of the large diameter section 28 in the lower side section 26*b* and the upper surface 46 of the mounting base 20 overlap with each other. By means of these interlocking convex portions 32, 32 and interlocking concave portions 52, 52, a concave-convex interlocking portion is configured at both sides in the longitudinal direction of the stabilizer bush 10 so as to extend between the overlapping faces in the width direction and mutually engages.

As also shown in FIG. 5, in a state where no external force is exerted on the rubber bushing body 18, the width dimension A of the section (upper end portion) of the mounting base 20 that overlaps with the rubber bushing body 18 (see FIG. 5) shall be preferably less than the maximum width dimension B (see FIG. 5) of the rubber bushing body 18 (A≤B), more preferably, the width dimension A of the upper end portion of the mounting base 20 has been made smaller than the maximum width dimension B of the rubber bushing body 18 (A<B). In the present embodiment, of the interlocking convex portions 32, 32 in the rubber bushing body 18, the vertical center portion has the maximum width size, and is made slightly larger than the width dimension A of the section in the mounting base 20 where interlocking concave portions 52, 52 is formed and the width dimension is made partially larger. Moreover, in the present embodiment, both widthwise end faces of the mounting base 20 extend in the vertical direction, and the maximum width dimension of the mounting base 20 is made equal to the width dimension of the upper end portion. However, for example, in cases where the mounting base 20 has a large width dimension on the lower side etc., the maximum width dimension of the mounting base 20 can be made larger than the maximum width dimension of the rubber bushing body 18.

The stabilizer bar 12 is inserted into the inner hole 24 in the rubber bushing body 18 of the stabilizer bush 10 having a structure as described above, and the stabilizer bush 10 is mounted on the vehicle by externally fitting the bracket 14 from the upper side of the rubber bushing body 18 followed by fixing the said bracket 14 to the vehicle body 16. That is, an arrangement is provided wherein the rubber bushing body 18 is mounted on the vehicle body 16 via the mounting base 20, and the surface overlapping with the mounting base 20 in the rubber bushing body 18, that is, the outer peripheral surface 30*a* of the large diameter section 28 in the lower side section 26*b*, is made as the mounting surface that will be attached to the vehicle body 16. Thereupon, the mounting base 20 is superimposed and mounted on the mounting surface of the rubber bushing body 18.

In the present embodiment, since the rubber bushing body 18 is provided with a cutout 44, the rubber bushing body 18 expands and deforms at the formation portion of the cutout portion 44, and by being sandwiched from the side of the stabilizer bar 12, the stabilizer bar 12 is inserted into the rubber bushing body 18. The slippage between the rubber bushing body 18 and the stabilizer bar 12 may be improved by interposing a self-lubricating synthetic resin or a lubricant, or by applying such as a coating etc., between the inner hole 24 and the stabilizer bar 12 However, it is also possible to adhere the rubber bushing body 18 and the stabilizer bar 12 to each other. Namely, the stabilizer bush 10 of the present invention may be a stabilizer bush of a type that adheres to the stabilizer bar 12.

Figure 2:
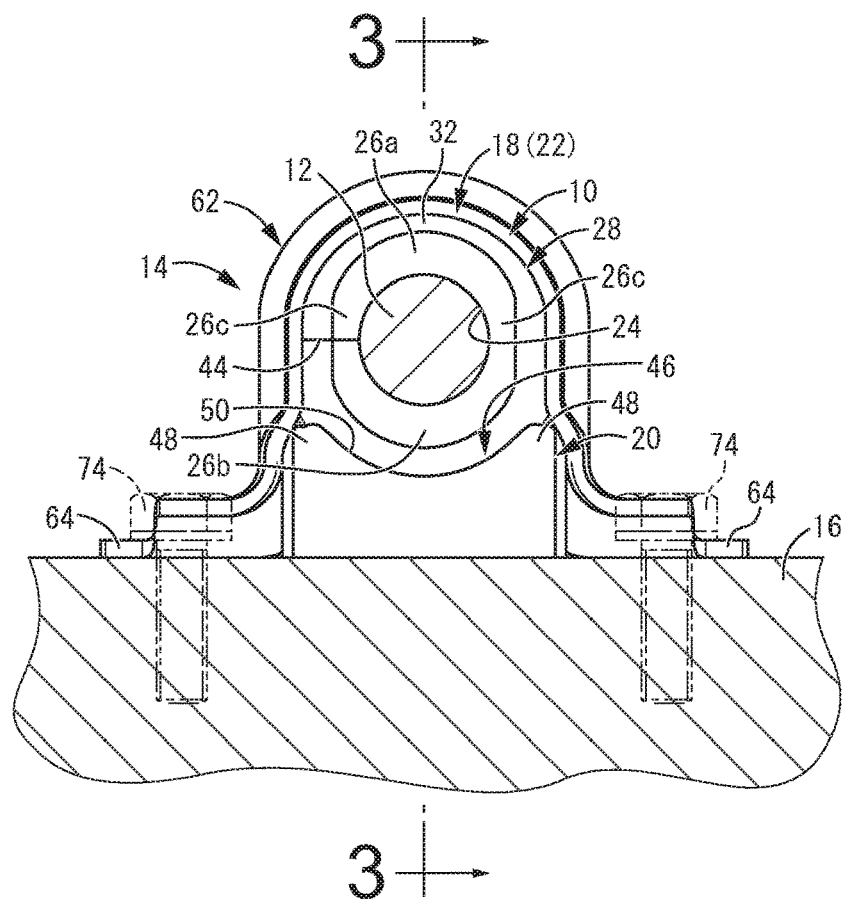
FIG. 2 is a front view of the stabilizer bush of FIG. 1.

Here, the bracket 14 does not constitute the stabilizer bush 10, and does not give any limitation for the present invention. The bracket 14 of the present embodiment, as shown in FIG. 2 etc., is configured by including a portal member 62 with a substantially inverted U shape, and one pair of mounting portions 64, 64 extend outward from both ends of the opening of the portal member 62. Furthermore, on both sides in the length direction of the portal member 62 (vertical direction FIG. 1), the inner diameter dimension has been made larger than the length direction middle section and interlocking concave portions 66, 66 that open on the inside have been formed by extending in the circumferential direction. As a result, the inner diameter of the length direction middle section has been made smaller than the longitudinal both side portions, and in the lengthwise middle section of the interlocking concave portions 66, 66, a central convex portion 67 protruding more on the inside compared than the interlocking concave portions 66, 66 is provided. These interlocking concave portions 66, 66 and the central convex portion 67 are formed to almost correspond to the interlocking convex portions 32, 32 and concave groove 34 respectively of the rubber bushing body 18. In the present embodiment, the inner surfaces extending towards the length direction end section from the interlocking concave portions 66, 66 have been formed as inclined surfaces 68, 68 which incline in the inside as they go outward in the longitudinal direction.

Furthermore, the maximum vertical dimension of the inner peripheral surface of the portal member 62 (the dimension from the inner peripheral surface of the portal member 62 up to the overlapping surface of the mounting portions 64, 64 and the vehicle body 16) is made smaller than the vertical dimension of the stabilizer bush 10 in the non-mounted state (that is, the vertical dimension in the state of FIGS. 5 to 10). That is, the maximum vertical dimension C1 (see FIG. 3) of the inner circumferential surface in the middle portion in the longitudinal direction of the portal member 62 (the portion where the central convex portion 67 is formed) is made smaller than the vertical dimension D1 (see FIG. 6) in the middle portion in the longitudinal direction of the stabilizer bush 10 (the portion where the concave groove 34 is formed). At the same time, the maximum vertical dimension C2 (see FIG. 3) of the inner circumferential surface in the forming portion of the interlocking concave portions 66, 66 of the portal member 62 is smaller than the vertical dimension D2 (see FIG. 6) of the formation portions of the interlocking convex portions 32, 32 of the stabilizer bush 10.

Furthermore, the widthwise dimension of the inner peripheral surface of the portal member 62 is made larger than the widthwise dimension of the mounting base 20, so that the operation of mounting the bracket 14 to the stabilizer bush 10 becomes easy. The dimension in the width direction on the inner peripheral surface of the portal member 62, in the opening section (lower side in FIG. 2) of the portal member 62 into which at least the mounting base 20 is inserted, may be made larger than the widthwise dimension of the mounting base 20. In the present embodiment, by forming the inner circumferential shape of the opening portion of the portal member 62 into a shape substantially corresponding to the outer peripheral shape of the mounting base 20, and increasing the width dimension by a predetermined dimension, gaps 70, 70 has been formed between the inner peripheral surface of the opening portion of the portal member 62 and the outer peripheral surface of the mounting base 20 in the width direction. The gaps 70, 70 have a substantially constant width dimension E (see FIG. 4) in over the entire length in the length direction of the mounting base 20 and the portal member 62. In the present embodiment, it is preferable that the width dimension E of the gaps 70, 70 is set in the range of 0.5 mm-1.5 mm. Regarding the dimensions of the bracket 14 including such as the width dimension E of the gap 70, etc., as long as a mounted state fixed to the vehicle is achieved, the dimensions of the bracket 14 are not limited in the state before mounting. That is, the bracket 14 may be attached with some deformation.

The inner peripheral shape of the portal member 62 on the closed side (the upper side in FIG. 2) has been made into a shape that is slightly smaller than the outer peripheral shape of the rubber bushing body 18 on which the bracket 14 is not mounted. That is, for example, the inner diameter dimension F (see FIG. 4) of the inner peripheral surface at the intermediate portion in the length direction of the portal member 62 is made smaller than the widthwise dimension G (see FIG. 8) of the intermediate portion in the length direction of the rubber bushing body 18 on which the bracket 14 is not mounted. Moreover, since the inner circumferential shape of the portal member 62 substantially corresponds to the outer peripheral shape of the rubber bushing body 18, over almost the entire length in the length direction of the rubber bushing body 18 and the portal member 62, the inner diameter dimension of the inner peripheral surface of the portal member 62 is made smaller than the widthwise dimension of the rubber bushing body 18 in which the bracket 14 is not mounted.

The bracket 14 having the above said shape is attached to the vehicle body 16 by fitting externally to the stabilizer bush 10, and screwing the bolts 74, 74 to the bolt insertion holes 72, 72 provided in the mounting portions 64, 64. In the peripheral wall part 22 of the rubber bushing body 18, the inner peripheral surface of the bracket 14 is superimposed on the outer peripheral surface 30a of the upper side section 26a and the widthwise side sections 26c, 26c, the interlocking convex portions 32, 32 of the rubber bushing body 18 are fitted into the interlocking concave portions 66, 66 of the bracket 14, and the central convex portion 67 of the bracket 14 is fitted into the concave groove 34 of the rubber bushing body 18.

In this case, as the vertical dimension and the widthwise dimension of the inner peripheral surface of the bracket 14 are made smaller than the vertical dimension of the stabilizer bush 10 and the widthwise dimension of the rubber bushing body 18 in the non-mounted state of the bracket 14, fixing of the bracket 14 to the vehicle body 16 will compress the rubber bushing body 18 between the bracket 14 and the vehicle body 16 (mounting base 20). As a result, in the outer peripheral surface 30 of the rubber bushing body 18, the outer peripheral surface 30a of the large diameter section 28 in the lower side section 26b, which is the attachment surface to the vehicle body 16, will be pressed against the vehicle body 16 side via the mounting base 20.

The rubber bushing body 18 compressed in this manner in the vertical direction as well as in the width direction by being pressed against the vehicle body 16, and depending on such compression force, particularly in the length direction middle portion of the rubber bushing body 18, both widthwise end portions of the portion overlapping on the mounting base 20 will be squashed in the lower direction towards the mounting base 20, and elastically deforms so as to bulge downward on outside of both sides in the width direction from the mounting base 20 that has been formed as a free surface, and enters into gaps 70, 70 between the mounting base 20 and the bracket 14. That is, provided in the rubber bushing body 18 are shock absorbing rubber parts 76, 76 which, according to the compression of the rubber bushing body 18, will enter into the gaps 70, 70 between the mounting base 20 and bracket 14.

The shock absorbing rubber parts 76, 76 extend downward along the widthwise outer surface of the shoulder portions 48, 48 of the mounting base 20, and in the present embodiment, the extension dimension H of the shock absorbing rubber parts 76, 76 (the vertical dimension from the upper ends of the shoulder portions 48, 48 up to the lower ends of the shock absorbing rubber parts 76, 76) is set in a size that will not reach the entire height direction dimension of the gap 70, preferably in the range 0.5 mm to 2.5 mm. The shock absorbing rubber parts 76, 76 will not assume an undercut shape in the outer peripheral surface 30 of the rubber bushing body 18, and are formed by simply varying the outer diameter dimension of the rubber bushing body 18 in circumferential direction.

In the present embodiment, inclined surfaces 54, 54 that incline upwards are provided at both ends of the length direction of mounting base 20, and also provided at both ends of the length direction of portal member 62 are inclined surfaces 68, 68 that incline in the inner circumference side. That is, with the help of these inclined surfaces 54, 54 and inclined surfaces 68, 68, the inner diameter dimension between the portal member 62 and mounting base 20 gradually becomes smaller in the length direction. Accordingly, when the rubber bushing body 18 is compressed by mounting the bracket 14, these inclined surfaces 54, 54 and inclined surfaces 68, 68 are shaped so as to cover the interlocking convex portions 32, 32 of the rubber bushing body 18 from outside in the longitudinal direction.

Figure 3:
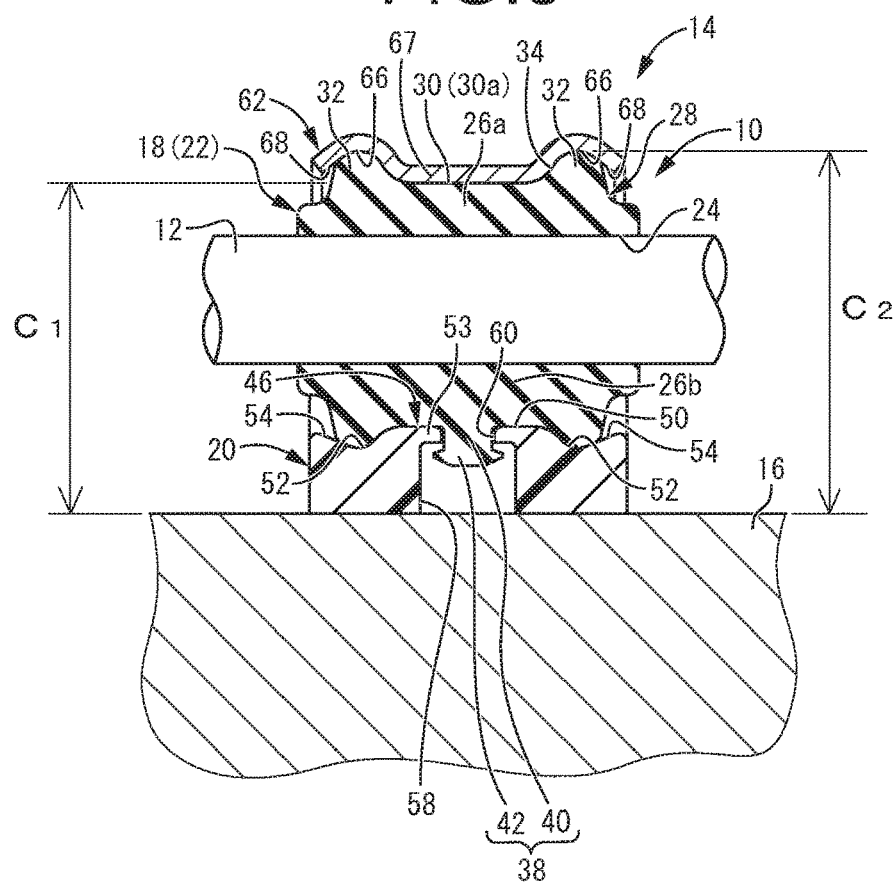
FIG. 3 is a cross sectional view taken along line 3-3 of FIG. 2.
Figure 4:
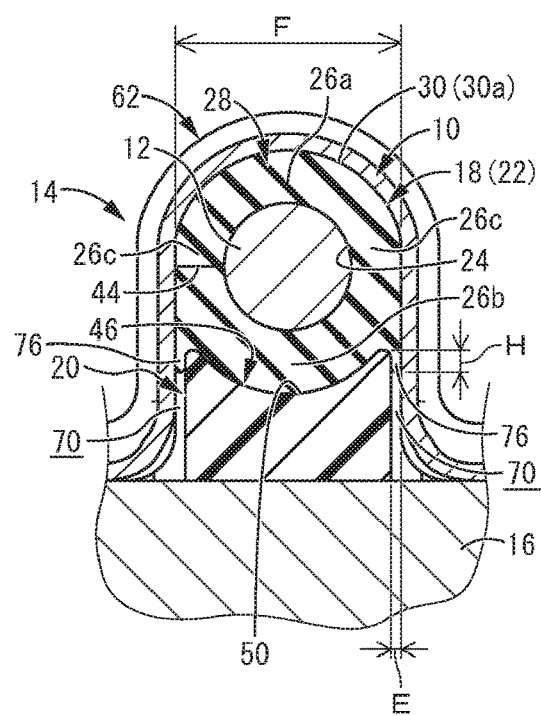
FIG. 4 is a principal part view of transverse cross section taken along line 4-4 of FIG. 1.

Therefore, when the rubber bushing body 18 is subjected to compression, due to the elastic deformation of the rubber bushing body 18, the length dimension of the rubber bushing body 18 becomes larger than the length dimension of the mounting base 20 as shown in FIG. 3. Here, the bulging deformation towards the outside of the length direction of the section that constitutes interlocking convex portions 32, 32 is prevented, thereby it can be effectively compressed and deformed.

In the stabilizer bush 10 having the structure as described above, the shock absorbing rubber parts 76, 76 that are provided in the rubber bushing body 18 are positioned in the gaps 70, 70 between the mounting base 20 and the bracket 14. As a result, even when the mounting base 20 is displaced in the circumferential direction by the action of an external force from the stabilizer bar 12 in the torsional direction of the circumferential direction, a direct striking of the mounting base 20 and bracket 14 is avoided, and generation of an abnormal noise is effectively suppressed. That is, although gaps 70, 70 are provided between the mounting base 20 and the bracket 14 in order to mount the mounting base 20 and the bracket 14 together, the problem (i.e. generation of abnormal noise) due to providing the said gaps 70, 70 can be effectively prevented by the shock absorbing rubber parts 76, 76.

In the present embodiment, in addition to engaging the positioning protrusions 36, 36 protruding from the rubber bushing body 18 with the positioning concave portions 56, 56 provided in the mounting base 20, a locking projection 38 protruding from the rubber bushing body 18 is inserted into the insertion hole 60 of the attachment base 20. As a result, the rubber bushing body 18 is prevented from rotating around the center axis of the mounting base 20. It is possible to effectively prevent the adverse effect on the vehicle running performance, in case the stabilizer bar 12 and the rubber bushing body 18 are unintentionally relatively displaced in the circumferential direction, for example.

Due to these engagements, the displacement of the stabilizer bar 12 in the torsion direction may result in the rotation and displacement of the mounting base 20 in the circumferential direction becoming easier. However, even under such conditions, it is possible to effectively prevent the occurrence of abnormal noise due to mutual striking of the mounting base 20 and the bracket 14. That is, in the stabilizer bush 10 of the present embodiment, while suppressing the relative displacement in the circumferential direction of the rubber bushing body 18 with respect to the mounting base 20, it is possible to eliminate the problem (generation of abnormal noise) due to the integral displacement of the rubber bushing body 18 and the mounting base 20 by providing the shock absorbing rubber parts 76, 76.

The stabilizer bush 10 is arranged such that both end portions in the width direction of the rubber bushing body 18 are expanded and deformed by the compression force accompanying the fixing of the bracket 14, and enter the gaps 70, 70 between the mounting base 20 and the bracket 14. According to the present embodiment, in particular, in a state when no external force is exerted on the rubber bushing body 18, the maximum width dimension B of the rubber bushing body 18 is made larger than the width dimension A in the upper end portion of the mounting base 20 (A<B). This arrangement causes more easily the deformation entering into the gaps 70, 70 at the time of assembling.

In the present embodiment, the shoulder portions 48, 48 of the widthwise opposite side edge portions of the mounting base 20 is made into curved corner section by R-chamfering. Therefore, the expansion and deformation of the rubber bushing body 18 along the shoulder portions 48, 48 becomes even easier, and the shock absorbing rubber parts 76, 76 will enter more reliably into the gaps 70, 70.

Furthermore, in the present embodiment, apart from providing interlocking convex portions 32, 32 in the rubber bushing body 18, interlocking convex portions 52, 52 have been provided in the mounting base 20, and they engage with each other when the rubber bushing body 18 and the mounting base 20 are assembled. In particular, in the present embodiment, interlocking concave portions 66, 66 have been provided even in the bracket 14, and they will engage with the interlocking convex portions 32, 32 of the rubber bushing body 18. As a result, axial positioning of the stabilizer bush 10 and the stabilizer bar 12, and suppression of the expansion displacement of the rubber bushing body 18 at the time of input can be achieved.

By providing inclined surfaces 54, 54 at both axial end portions of the mounting base 20 as well as providing inclined surfaces 68, 68 at both axial end portions of the bracket 14, the inner diameter dimension between the mounting base 20 and bracket 14 becomes smaller in the axially outward direction. Accordingly, the axial positioning of the stabilizer bush 10 and the stabilizer bar 12, as well as the effect of suppressing the amount of expansion of the rubber bushing body 18 in the axial direction at the time of input can be improved.

As a result, when mounting the rubber bushing body 18, the compressed and deformed rubber in the rubber bushing body 18 can be more easily introduced into the gaps 70, 70 between the mounting base 20 and the bracket 14.

Furthermore, in the present embodiment, by inserting in the insertion hole 60 of the mounting base 20 by providing a locking projection 38 in the rubber bushing body 18, the rubber bushing body 18 and the mounting base 20 are assembled such that they cannot be separated from each other. As a result, by fixing the bracket 14 externally with respect to the stabilizer bush 10, the work of fixing the bracket 14 to the vehicle body 16 can be performed efficiently.

Although the embodiments of the present invention have been described in detail above, these are merely illustrations. The present invention should not in any way be construed to be limited to the specific description in this embodiment.

For example, in the above embodiments, the rubber bushing body 18 and mounting base 20 are maintained in an assembled state by providing a locking projection 38 on the rubber bushing body 18 and passing into the insertion hole 60 of the mounting base 20. However, these locking projection 38 or insertion hole 60 are not essential, and it is also possible, for example, maintain the rubber bushing body 18 and the mounting base 20 with an adhesive. It is not necessary to maintain the rubber bushing body 18 and the mounting base 20 in an assembly state, and it is also possible to superimpose the rubber bushing body 18 and the mounting base 20 without fitting, and sandwich mounting base between the rubber bushing body 18 and vehicle body by the pressing force of the bracket 14 on the vehicle body 16.

In the said embodiments described above, the maximum width dimension A of the mounting base 20 was made smaller than the maximum width dimension B of the rubber bushing body 18 (A<B). However, if there is a shock absorbing rubber part 76 that can enter in the gap 70 between the bracket 14 and mounting base 20 due to the compression of the rubber bushing body 18, the width dimension A in the overlapping portion of the mounting base and the rubber bushing body 18 may be made equal to the maximum width dimension B of the rubber bushing body 18 (A=B), or alternatively the width dimension A in the overlapping portion of the mounting base 20 and the rubber bushing body 18 may be made larger than the maximum width dimension B of the rubber bushing body (B<A).

Furthermore, in the embodiments described above, a large diameter section 28 having the interlocking convex portions 32, 32 or concave groove 34 has been provided in the rubber bushing body 18. However, such interlocking convex portions or concave groove are not essential, and it is possible to make the rubber bushing body 18 in tubular shape having substantially predetermined outer diameter over the entire length of length direction dimension, or the outer peripheral surface of the lower portion may be made as a flat surface spreading in the horizontal direction. Also, a curved concave surface 50 or an interlocking concave portion 52 etc., are not indispensable even in mounting base 20. For example, it is also possible that the upper surface, which is the overlapping side with the rubber bushing body 18, can be made as a flat surface extending in the horizontal direction.

What is claimed is:

1. A stabilizer bush comprising:
   a tubular rubber bushing body having an inner hole for inserting a stabilizer bar; and
   a mounting base provided on a fixing surface of the rubber bushing body against a vehicle body;
   wherein the stabilizer bush is configured to be installed on the vehicle body such that an outer peripheral surface of the rubber bushing body is press-fitted on a side of the vehicle body via the mounting base by a roughly U-shaped bracket to be fixed to the vehicle body,
   wherein the rubber bushing body includes a shock absorbing rubber part that is elastically deformed due to a compression force caused by pressing of the bracket, bulges to both sides in a width direction of the mounting base, and enters and interposes between the mounting base and the bracket, and
   wherein the stabilizer bush comprises a locking portion inserted through a central concave portion of the mounting base, the locking portion provided for maintaining an assembled state of the mounting base and the rubber bushing body by preventing mutual detachment.

2. The stabilizer bush according to claim 1, wherein the mounting base has a width dimension A at a side of overlapping with the rubber bushing body, and with respect to the width dimension A, a maximum width dimension B of the rubber bushing body is set as A ≤B in a state where there is no external force on the rubber bushing body.

3. The stabilizer bush according to claim 1, further comprising concave-convex interlocking portions provided between overlapping surfaces of the mounting base and the rubber bushing body, the concave-convex interlocking portions extending in a width direction on both side portions in a length direction of the rubber bushing body.

4. The stabilizer bush according to claim 1, wherein on an overlapping surface of the mounting base against the rubber bushing body, curved corner sections are formed by R-chamfering corners at both side edge portions in the width direction.

5. The stabilizer bush according to claim 1, wherein the shock absorbing rubber part extends from an outer surface of a shoulder portion of the mounting base and is configured to reach a gap between the mounting base and the bracket.

6. The stabilizer bush according to claim 5, wherein an extension dimension of the shock absorbing rubber part is set in a size from 0.5 mm to 2.5 mm.

* * * * *